March 12, 1968 — V. MARASCO — 3,372,636
ROTISSERIE
Filed Oct. 20, 1965
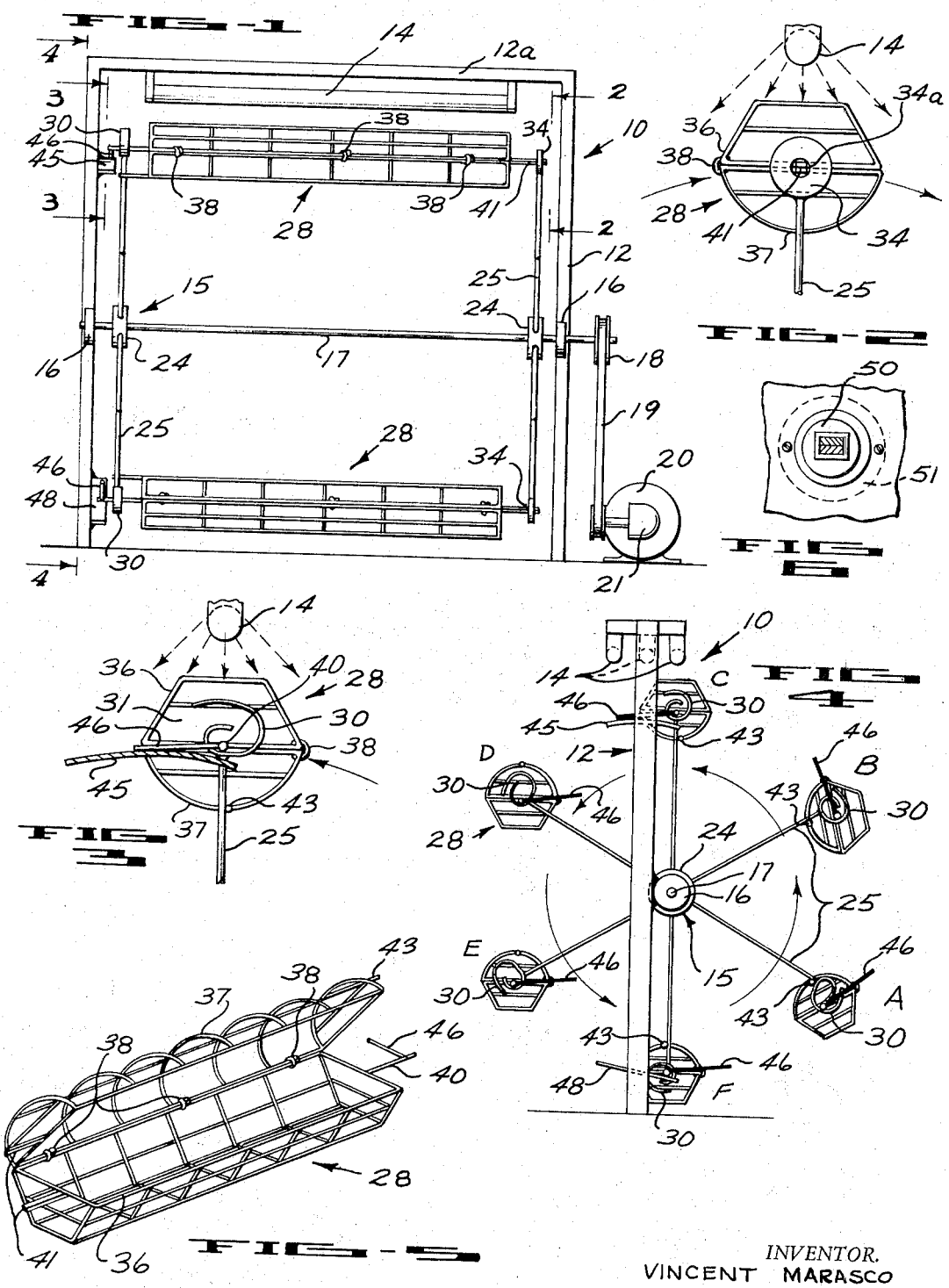
INVENTOR.
VINCENT MARASCO
BY
ATTORNEYS

United States Patent Office 3,372,636
Patented Mar. 12, 1968

3,372,636
ROTISSERIE
Vincent Marasco, 1364 N. Western Ave.,
Los Angeles, Calif. 90027
Filed Oct. 20, 1965, Ser. No. 498,269
6 Claims. (Cl. 99—427)

ABSTRACT OF THE DISCLOSURE

A rotisserie of the Ferris wheel type has several rotatable baskets with hinged lids for holding food to be cooked. Pivot pins mounting each basket are split longitudinally, one half being on the hinged lid. A journal bearing receiving the pin endwise holds the pin together and the lid closed.

The present invention relates generally to cooking apparatus; and it is more especially concerned with a rotating grill or broiling apparatus; often termed a rotisserie, which moves a number of pieces of meat or other food relative to a heat source in order to roast or broil the food.

Broiled or barbecued meat, such as fowl or roasts, has recently come into particular favor. Meat prepared in this style is now sold in many markets, delicatessens, restaurants, and the like. Such devices use one or more spits which are rotatably mounted on a suitable type of carrier for obtaining the desired movement of the food relative to a heat source.

When a spit must be forced through a chicken or a roast, it is relatively hard manual work to load and unload a number of these spits each holding several pieces, especially if the work is done by women. Handling the hot spits fresh off the rotisserie is cumbersome work and is often done while wearing heavy asbestos gloves or the like which make it impractical to manipulate fine latches and other small members. Also, larger cooking units carrying several chickens or the equivalent weight may be heavy and hard to handle.

Thus it is a general object of the present invention to devise a novel type of broiler or rotisserie which is easier to load and unload, more convenient and easier to handle with resultant savings in time and increased safety.

It is a further object of the present invention to devise a novel type of grill or rotisserie having a plurality of units carrying food articles which are arranged to expose all sides of the food to a heat source while at the same time maintaining simplicity of construction.

These and other objects of the present invention are achieved by providing a rotating grill for broiling or roasting articles of food comprising a wheel-like carrier rotatably mounted on a stationary frame to turn about a generally horizontal axis relative to a heat source. A plurality of article holders, preferably in the form of closed baskets, are individually rotatably mounted upon the carrier to be moved thereby in succession past the source of heat as the carrier rotates. In order to secure proper rotation of each of the article holders with respect to the heat source, means are provided to prevent rotation of each holder relative to the carrier during an initial portion of each revolution of the carrier, following which the carrier turns under the influence of gravity, but initially at a controlled rate by engaging suitable means mounted on the frame.

The individual article holders are of novel design, comprising a basket with a hinged lid which completely encloses the food, the basket being provided with pivot pins coaxially aligned, one pin at each of opposite ends of the basket. One of the pins is split longitudinally with one section of the pin attached to the basket and the other section to the lid. When this pin is journaled in a suitable holder or bearing member on the carrier, the two sections of the pivot pin are held together, thus keeping the basket closed, as it turns over in the course of normal operation of the carrier, without requiring latches or springs.

How the above and other objects and advantages of the present invention are achieved will be more readily apparent by reference to the following description, and to the annexed drawing, in which:

FIG. 1 is a side elevation of a rotating grill constructed according to the present invention.

FIG. 2 is a fragmentary end elevation on line 2—2 of FIG. 1 showing a single basket at the top of its circular path.

FIG. 3 is a fragmentary end elevation on line 3—3 of FIG. 1 showing a single basket at the top of its circular path, the basket being in engagement with means for controlling turning of the basket as it passes top dead center.

FIG. 4 is an end elevation of the rotating grill taken from the left of FIG. 1.

FIG. 5 is a perspective view of one of the food carrying baskets with the lid partially open.

FIG. 6 is a fragmentary section and elevation of a socket receiving the split pivot pin on one end of the food carrying basket.

Referring now to the drawing, and more particularly to FIGS. 1 and 4, it will be seen that the rotisserie indicated therein generally at 10 comprises a stationary frame 12 having a crossbar 12a upon which is mounted an infra-red lamp 14 which is typical of any desired type of heat source that may be employed. Although only a single lamp is here shown, it will be understood that the invention is in no way limited by the specific location or number of units in the heat source illustrated.

The rotisserie is here shown without any enclosure, but it will be understood that such enclosure is normally added. The enclosure is here removed for simplification of illustration and ease of description.

A rotating carrier, indicated generally at 15, is rotatably mounted upon the two uprights of frame 12. For this purpose, each of the uprights carries a bearing block 16 in which is rotatably mounted horizontally extending axle 17 of the carrier. At one end, axle 17 projects beyond frame 12 and carries a pulley 18 over which passes belt 19 by which the carrier is driven from motor 20 which is preferably the type that is provided with a speed reducing head 21.

At two spaced positions, hubs 24 are non-rotatably mounted upon axle 17, each of the hubs having a plurality of outwardly projecting arms 25 resembling the spokes of a wheel. Arms 25 are arranged in diametrically oppositely extending pairs, as shown in FIG. 6, to balance the loads; and while a total of six arms is shown here for each of hubs 24, it will be reailzed that any other suitable number, preferably an even number, of arms for each hub may be employed as desired.

Extending between and each supported by two axially spaced arms 25, are a plurality of food holders indicated generally at 28, described below. These food holders are each rotatably mounted upon a pair of arms 25 to turn individually and independently of one another with respect to carrier 15 as the carrier rotates about the horizontal axis established by axle 17. In order to rotatably support holders 28, the distal end of each arm 25 is provided with a suitable supporting or bearing member which engages and rotatably supports one end of a holder 28, as will now be described.

Referring to FIG. 3, it will be seen that each arm 25 at the left-hand side of the rotating assembly, is provided with a support member 30 in the form of an open spiral which has an arcuate extent in excess of 360°. The spiral member 30 is attached to the end of its supporting arm 25 at a position intermediate the ends of the spiral, thereby leaving at 31 an opening between two successive turns of the spirial which is utilized for engagement of the carrier with spiral member 30, as will be explained further.

From reference to FIG. 4 it will be seen that each spiral member 30 is positioned on an arm 25 so that on the upwarly moving side of carreir 15, that is, the right-hand side as viewed in FIG. 4, the opening 31 of the spiral 30 faces upwardly in the general direction of travel of the associated arm 25. Obviously, the opening faces downwardly when on the opposite or downwardly traveling side of carrier 15.

The arms 25 attached to the other hub 24 each carry a supporting and bearing member 34, as shown in FIG. 2, which supports the other end of a holder 28. The member 34 is preferably a closed ring or the like attached to the end of an arm 25; but any equivalent type of member which is, in effect, circumferentially continuous, may be used.

One of the food holders 28 is shown in detail in FIG. 5, in which it will be seen that the holder comprises an open mesh wire basket 36 having an open mesh cover 37 which is hingedly connected to the basket 36 along one side by any suitable hinge means 38. Basket 36 has an access opening at one side which is closed by lid 37 when the lid is lowered to the position shown in FIGS 2 and 3. The lid is shown in partially raised or opened position in FIG. 5. The assemby of the basket and its lid 37 is commonly referred to as a basket; and it will be seen that when the lid is closed, the two parts form, in effect, a cage which confines articles of food, such as chickens or pieces of beef, which are larger than the openings in the mesh of the basket and its lid.

The basket is provided at each end with a pivot pin, as may be seen in FIG. 5. At one end, the pivot pin 40 is a solid pin attached only to the main portion 36 of the basket. At the other end, the pivot pin 41 is split longitudinally, that is, along an axial plane, into two sections. One section is attached to the basket 36, while the other section is attached to the cover 37, the two secions of the pin being brought together into overlying position when the lid is closed to become effectively a single pivot pin rotatably supporting one end of the basket.

In use, the basket is filled, lid 37 is then closed, bringing together the two sections of pivot pin 41, and then the basket is mounted on the rotating carrier 15. This is accomplished by first inserting pin 41 by endwise or axially directed movement into the opening 34a in basket supporting member 34 on the set of arms 25 at the right-hand end of the carrier. As is shown particularly in FIG. 2, the opening 34a in the support 31 is of a size to receive pin 41. Opening 34a is circular in outline so that regardless of the shape of pin 41, the pin is free to turn within opening 34a. The size of the opening is such that the two sections of pin 41 are held substantially together for all rotational positions of the basket relative to the carrier, thus keeping the lid closed and keeping the contents in the basket.

After pin 41 is inserted as described, pin 40 is then dropped into the appropriate supporting member 30 at the other end of the carrier. The basket is preferably mounted on the carrier at the side thereof which is upwardly moving, as, for example, at the lower right-hand position A in FIG. 4. It will be noticed that at this position of carrier 15, opening 31 in support member 30 is upwardly facing and the basket pivot pin can be mounted in place simply by dropping it down into opening 31 and the pin then rests on member 30 at the lowest point thereof. The same procedure may be followed at any position along the upwardly moving side of carrier 15, for example, at the upper right-hand position B.

Pin 41 is here shown as being square or rectangular in outline for reasons which will be further explained; but it will be understood that the pin may equally well be made circular in outline.

Carrier 15 with its wheel-like structure and the several food holders 28 mounted thereon resembles a Ferris wheel. Like a Ferris wheel, the holders with the food are gravity biased to a given position so that, if free to turn, the same side remains lowermost. If this were the case in this construction, revolution of carrier 15 would cause each food holder to turn with respect to the carrier but the holder would not turn in space. Thus, only one side of the food would be presented to heat source 14.

To avoid this situation, means are provided to prevent rotation of each holder relative to the carrier during a portion of each revolution of the carrier. Such means takes the form of pin 43 projecting outwardly from one end of a good holder and engaging carrier 15. More particularly, pin 43 is so located on each food holder 28 that it engages the associated arm 25, engagement normally taking first at or near the bottom center position designated F in FIG. 4. Thus as the carrier revolves, the upwardly moving holders moving through positions A, B, and C are held non-rotatably with respect to carrier 15 by pin 43 engaging an arm 25. Consequently when the food holder reaches the top center position C, it is inverted, as shown in FIG. 4.

As a basket passes the top dead center position at C, the center of gravity of the basket and the food in it passes to the leading side of the supporting arm 25 and, if unrestrained, the basket quickly turns on its pivotal supports 40, 41 from the inverted position shown to an upright position. A free-swinging basket turns very quickly, oscillates through a few short arcs, and then settles down to the new position. It will be realized that this motion is so quick that any articles of food in the basket are heated chiefly on the top and on the bottom.

This situation is remedied by providing means controlling the rate of turn under gravity of each food holder immediately after it passes the top dead center position, which represents substantially the end of that portion of the revolution during which turning of the holder is prevented by engagement of a pin 43 with an arm 25. This means consists of a stationary shoe 45 mounted upon one post of the frame 12. This shoe may be either straight or slightly curved, as shown. It is engaged by a radially extending arm 46 attached to the article holder, preferably by being welded or otherwise secured to pivot pin 40, as shown particularly in FIG. 5.

As arm 46 moves along shoe 45, the basket is initially held against turning freely and is preferably maintained in its inverted position, as shown in FIG. 3. Then as the rod slides off the end of the shoe, the left-hand end in FIG. 3, the article holder is allowed to turn slowly upright under the influence of gravity, thus turning about 180°. At the same time, the turning movement is accomplished smoothly and without unnecessary swinging of the basket. The result is controlled exposure of substantially all sides of any articles in the basket to heat from source 14.

As mentioned above, each food holder 28 is pivotally supported by pins 40 and 41. The opening 34a is preferably but little larger than pin 41 but is sufficiently large to allow the basket to swing freely. On the other hand, it will be seen that the solid pin 40 can slide to shift position along the spiral support member 30, since it is always in engagement with the lowest portion of the spiral. Shortly after the holder passes the position F at or near bottom dead center of carrier 15, pin 40, if otherwise unrestrained, drops from the inner end of the spiral onto the outer turn of the spiral, as shown at position A. While this is not objectionable, it does create some noise; and a smoother and more silently running rotating grill can be obtained by providing pin shifting mechanism in the form of bar 48 which is stationary and attached to an upright post of frame 12 near the bottom of the post. The bar picks up each pin 40 as it passes, causes the pin to slide along to the end of the bar, and then allows the pin to drop onto the outermost turn of spiral 30 through a short distance, rather than with a louder and heavier drop as would occur otherwise somewhere between positions F and A.

One of the big advantages of the present invention is the fact that the food holder 28 can be held locked in closed position without the use of any spring catches or hooks which are difficult to manipulate when the basket is hot and filled with freshly cooked food. The asbestos mittens usually worn while handling a basket and its contents to take it off the carrier make it very difficult to manipulate any type of fastening means, even the simplest. In this instance, the basket is removed from the carrier by reversing the procedures described above. The pin 40 is first disengaged from its spiral support 30 by lifting it upwardly and outwardly from the spiral through the opening 31. After this, the basket is moved bodily endwise to free split pin 41 from eye 34. Now the top of the basket is free and by merely inverting the basket, its contents can be dumped out on a tray, plate, or other surface since cover 37 opens up by the contents falling against it as the holder is inverted. Thus loading and unloading the basket is reduced to the simplest of operations.

Broadly speaking, carrier 15 constitutes means for inverting the basket 28 periodically, together with its contents, while moving the contents relative to the heat source 14. Advantage may be taken of the novel characteristics of the basket as a food holder even when only a single basket is required, by mounting the food holder to rotate about the axis established by the two coaxial pins 40 and 41. For this purpose, split pin 41 can be inserted by endwise movement into a squared socket 50 driven by electric motor 51 or other source of power, the other end of the basket 28 being supported in any kind of a fixed seat or support allowing rotation of the basket. Thus as socket 50 is rotated by motor 51, the basket or holder 28 is rotated about its own axis relative to a source of cooking heat. Thus the basket can be adapted to a small broiler or barbecue, such as the types commonly found in homes and in backyards. Consequently it will be appreciated that the novel features of design of the food holder 28 have uses and advantages apart from being mounted upon the rotating carrier 15.

From the foregoing description, it will be understood that various changes in the specific design and arrangement of the elements constituting the improved rotating grill desscribed above may occur to persons skilled in the art but without departing from the spirit and scope of the present invention. Accordingly, it is to be understood that the foregoing description is considered as being illustrative of, rather than limitative upon, the invention as defined by the appended claims.

I claim:

1. A rotating grill for roasting articles of food, comprising in combination:
    a stationary frame;
    a carrier rotatably mounted on the frame to turn about a substantially horizontal axis relative to a source of heat;
    a plurality of article holders each rotatably mounted on the carrier to turn individually about a substantially horizontal axis and to be moved thereby in succession past said source of heat;
    a pin on each holder engaging the carrier over about one-half of a revolution of the carrier during upward movement of the holder on the carrier to prevent rotation of the holder relative to the carrier;
    and means operative at the top center of the carrier travel to control the rate of turn of each holder under the influence of gravity as the holder passes the top center of its travel;
    each holder being unrestrained and free to turn under the influence of gravity over substantially the remaining half of the revolution involving downward movement of the holder.

2. A rotating grill as in claim 1 in which the means controlling turning of each holder includes
    a fixed shoe on the frame;
    and an arm on each holder engaging the shoe as the holder passes top center position to restrain turning movement of the holder by gravity as the carrier revolves.

3. A grill as in claim 1 in which each article holder comprises
    a basket having a hinged lid closing an access opening in the basket;
    and a pivot pin at each end of the basket journaled in bearing means on the carrier, said pins on the basket being coaxial, at least one pivot pin on each basket being split longitudinally into two sections of which one section is attached to the basket and the other is attached to the lid;
    and bearing means on the carrier having effectively continuous periphery and adapted to receive a split pin by endwise movement to hold the pin sections together and thereby hold the basket lid closed.

4. A rotating grill for roasting articles of food, comprising in combination:
    a stationary frame;
    a carrier rotatably mounted on the frame to turn about a substantially horizontal axis relative to a source of heat;
    a plurality of article holders each rotatably mounted on the carrier to turn individually about a substantially horizontal axis to be moved thereby in succession past said source of heat;
    each article holder comprising a basket with a hinged lid closing an access opening in the basket;
    and a pivot pin at each end of the basket journaled in bearing means on the carrier, said pins on each basket being coaxial;
    at least one pivot pin on a basket being split longitudinally into two sections of which one is attached to the basket and one to the lid, said pin sections being held together by the bearing means on the carrier to hold the lid closed as the holder turns;
    said bearing means on the carrier for one end of the basket having an effectively continuous periphery and receiving the associated basket split pin by relative axial movement and bearing means on the carrier for the opposite end of the basket having a peripheral opening and receiving the associated basket pin by relative radial movement.

5. A rotating grill as in claim 4 in which the last-mentioned bearing means is a member of generally spiral configuration having an extent in excess of 360°.

6. A grill for roasting articles of food, comprising in combination:
    a basket for holding an article of food to be roasted, said basket having a hinged lid closing an access opening;
    a pair of coaxial pins arranged one pin at each end of the basket, at least one pin being split longitudinally into two sections with one section attached to the basket and one section attached to the lid, said pin being of non-circular outline in cross-section;
    and means for inverting the basket periodically including support means for the basket engaging the pins, said support means including a member having a non-circular opening non-rotatably holding the split pin together to hold the lid closed when the basket is inverted and whereby rotation of the last mentioned member rotates the basket.

References Cited

UNITED STATES PATENTS

| | | | |
|---|---|---|---|
| 2,324,233 | 7/1943 | Parsons | 99—421 |
| 2,696,163 | 12/1954 | Galley | 99—427 |
| 2,833,205 | 5/1958 | Purtzer | 99—421 |
| 2,938,450 | 5/1960 | Carpenter et al. | 99—427 |
| 3,055,288 | 9/1962 | Aaronson | 99—427 |
| 3,196,776 | 7/1965 | Norton | 99—421 |

WALTER A. SCHEEL, *Primary Examiner.*

A. O. HENDERSON, *Assistant Examiner.*